US009205981B2

(12) United States Patent
Valentin (10) Patent No.: US 9,205,981 B2
(45) Date of Patent: Dec. 8, 2015

(54) SYSTEM AND METHOD FOR PROCESSING A COMMAND

(71) Applicant: Savoye, Dijon (FR)

(72) Inventor: Fabrice Valentin, Saint Memmie (FR)

(*) Notice: Subject to any disclaimer, the term of this patent is extended or adjusted under 35 U.S.C. 154(b) by 0 days.

(21) Appl. No.: 14/390,921

(22) PCT Filed: Apr. 3, 2013

(86) PCT No.: PCT/EP2013/057049
§ 371 (c)(1),
(2) Date: Oct. 6, 2014

(87) PCT Pub. No.: WO2013/150080
PCT Pub. Date: Oct. 10, 2013

(65) Prior Publication Data
US 2015/0066198 A1 Mar. 5, 2015

(30) Foreign Application Priority Data

Apr. 4, 2012 (FR) ...................... 12 53119

(51) Int. Cl.
*G06F 7/00* (2006.01)
*B65G 1/137* (2006.01)
*B65G 47/51* (2006.01)

(52) U.S. Cl.
CPC .......... *B65G 1/1373* (2013.01); *B65G 47/5109* (2013.01)

(58) Field of Classification Search
None
See application file for complete search history.

(56) References Cited

U.S. PATENT DOCUMENTS

| 8,327,609 B2 | 12/2012 | Krizmanic et al. |
| 2006/0245858 A1* | 11/2006 | Suess ........................... 414/277 |
| 2013/0275236 A1* | 10/2013 | Koke et al. ..................... 705/15 |
| 2014/0195032 A1* | 7/2014 | Horn et al. .................... 700/115 |

FOREIGN PATENT DOCUMENTS

| DE | 202006005115 U1 | 6/2006 |
| EP | 1681247 A1 | 7/2006 |
| EP | 1964792 A2 | 9/2008 |
| FR | 2915979 A1 | 11/2008 |

OTHER PUBLICATIONS

International Search Report dated Jun. 10, 2013 for corresponding International Application No. PCT/EP2013/057049, filed Apr. 3, 2013.

(Continued)

*Primary Examiner* — Yolanda Cumbess
(74) *Attorney, Agent, or Firm* — David D. Brush; Westman, Champlin & Koehler, P.A.

(57) ABSTRACT

An automated distribution system includes sources storing loads, at least one destination, a control system, a first common transport system for transporting the loads leaving the sources and, downstream of the first common transport system and upstream of and associated with each destination, at least one plurality of first FIFO buffer devices, each dual to one of the sources. To process a command, the control system performs a first ordering, by instructing each source that the loads listed in the command should exit the source in a desired order; then a second ordering: by steering each of the loads of the command, exiting the first common transport system to the first buffer device associated with the desired destination dual to the given source; and by instructing the first buffer devices associated with the desired destination such that the loads exit towards the destination in the desired order.

10 Claims, 6 Drawing Sheets

(56) References Cited

OTHER PUBLICATIONS

French Search Report dated Nov. 23, 2013 for corresponding French Application No. 1253119, filed Apr. 4, 2012.

International Preliminary Report on Patentability and English translation of the Written Opinion dated Oct. 7, 2014 for corresponding International Application No. PCT/EP2013/057049, filed Apr. 3, 2013.

* cited by examiner

SYSTEM AND METHOD FOR PROCESSING A COMMAND

CROSS-REFERENCE TO RELATED APPLICATIONS

This application is a Section 371 National Stage Application of International Application No. PCT/EP2013/057049, filed Apr. 3, 2013, the content of which is incorporated herein by reference in its entirety, and published as WO 2013/150080 on Oct. 10, 2013, not in English.

FIELD OF THE INVENTION

The field of the invention is that of logistics, and especially that of systems of automated distribution, especially but not exclusively for the preparation of parcels.

More specifically, the invention pertains to a technique for processing a customer order by means of a control system for driving or controlling a system of automated distribution. It is assumed that the system of automated distribution comprises load-storing sources and at least one load-receiving destination.

The driving or control system (also called a WCS or warehouse control system) is a computerized central management system responsible for driving the entire system of automated distribution as well for managing customer orders.

In the present description, the following definitions are used:
- a customer order is a list of loads having to be extracted from the sources and provided in a given sequential order to a given destination;
- the processing of a given customer order (the term generally used is the management of a given customer order) groups together all the actions carried out by the control system to control the system of automated distribution (including the sources) so that all the loads listed in this given customer order reach the desired destination according to the desired sequential order.

Again, the term "simultaneous processing of several customer orders" refers to the fact that the control system does not wait for one customer order to be entirely processed (i.e. it does not wait for all the loads listed in this customer order to reach the desired destination in the desired sequential order) before processing out (or at least starting to process) another customer order.

The following description distinguishes two types of simultaneous processing of a plurality of customer orders:
- a first type of simultaneous processing corresponds to the case where, among the plurality of customer orders processed simultaneously by the control system, each customer order is intended for a distinct destination. In this case, the control system does not wait for a first customer order intended for a first destination to be entirely processed (i.e. it does not wait for all the loads listed in this first customer order to reach the first desired destination in the desired sequential order) before processing (or at least starting to process) a second customer order intended for a second destination;
- a second type of simultaneous processing corresponding to the case where, among the plurality of customer orders processed simultaneously by the control system, all are intended for a same destination. In this case, the control system waits for only one customer order intended for this destination to be entirely processed (i.e. for all the loads listed in this first customer order to reach this destination in the desired sequential order) before processing (or at least starting to process) a second customer order intended for this same destination. It can be noted that, at the end of the processing of the first and second customers, the destination does not simultaneously receive the loads of these two customer orders but first of all receives the loads listed in the first customer order (in the desired sequential order) and then receives the load received in the second customer order (in the desired sequential order).

In practice, these two types of simultaneous processing can be combined: among the plurality of customer orders processed simultaneously by the control system, at least two customer orders are intended for distinct destinations, and at least two customer orders are intended for a same destination.

The invention can be applied especially but not exclusively when each source of the system of automated distribution is a part of a storage depot (this part of a storage depot is also called a storage unit here below in the description) and each destination of the system of automated distribution is a customer-order preparing station also called a picking station).

It is clear however that many variants can be envisaged without departing from the framework of the present invention: for example, each source can be defined as a storage depot or even as a unit comprising several storage depots or again as a storage device (which is less complex than a storage depot).

TECHNOLOGICAL BACKGROUND

We shall attempt more particularly here below in this document to describe the problems existing in the particular case where the system of automated distribution is used to prepare parcels. The invention is not limited of course to this particular application but is of value for any technique for processing a customer order by means of a control system for controlling a system of automated distribution having to cope with similar or proximate problems.

Parcel-preparing systems are more particularly used in firms for the dispatching and remote marketing of goods in small volumes. The main examples of users of these parcel-preparing automated systems are the suppliers of office equipment, clothing, cosmetic products, tools and spare parts in the engineering industry. These systems enable the preparation, with minimum labor, in a short time span and with precise stock tracking, of a parcel corresponding to a precise customer order from a customer, this customer order relating to different products in different quantities, each of the products with its quantity being identified by a customer order line (each customer order line therefore defines a storage container in which the desired product is situated).

One example of such an automated system for preparing parcels is described especially in the patent FR 2 915 979 filed by the present Applicant. It comprises for example:
- an automated storage depot containing products in storage containers (corresponding to the above-mentioned loads), each storage container being associated with a single product reference (these can also be the containers enclosing a specific customer order and/or a mixture of products);
- a customer-order preparing station where the products are picked up and placed by the operator in a parcel (a dispatch container);
- a set of conveyors carrying storage containers, in which the products from the storage depot are located, to the customer-order preparing or dispatch station and vice versa; and
- a warehouse control system (WCS).

The automated storage depot comprises for example four storage units, each storage unit being formed by a lane which, on either side, serves a storage rack (or shelving unit) with several levels of superimposed storage levels, each rack being sub-divided on its length into storage locations (also called cells) each intended to receive a storage container. At each storage level, each lane receives tracks for the movement of a transfer device (also called a collecting and transportation trolley or shuttle) which shifts the storage containers so that they can be positioned within the storage locations and picked from these locations. A track is generally formed by two parallel rails and the trolley is equipped with wheels to move on these rails. The trolleys can not only move horizontally at a given storage level but also be taken from one level to another of a lane when they transport or do not transport a storage container, by means of elevators (also called up/down elevators or spiral conveyors or mini-loaders) which are laid out on either end or on both ends of the alleys (or even in the middle). These elevators furthermore enable the transfer of a storage container placed on a trolley towards the conveyor unit.

The control system manages the customer order associated with each parcel (dispatch container) and listing storage containers (loads) according to the location of the storage containers in the storage depot, the availability of the trolleys and the storage depot elevators, as well as the sequential order in which these storage containers must follow one another to the customer-order preparing station. The purpose of this is to optimize all the movements and parcel preparation time and ensure synchronization between the arrival, at the preparing station, of a parcel being prepared and of the storage containers listed in the customer order associated with this parcel being prepared.

Figure 1A:
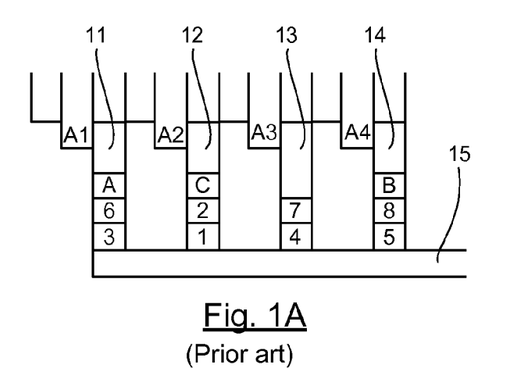
FIGS. 1A to 1C, already described with reference to the prior art, present a technique for processing a customer order by means of a control system in a classic system of automated distribution.
Figure 1B:
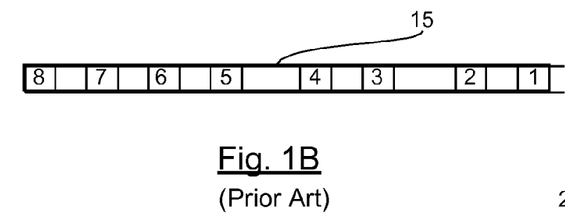
Figure 1C:
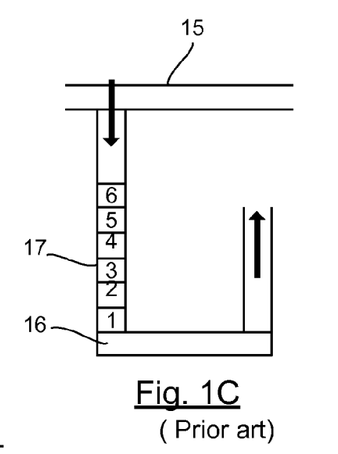

Referring now to FIGS. 1A, 1B and 1C, we present a more detailed view of a current technique for processing a customer order by means of the control system, in the particular context (presented here above) of an automated parcel-preparing system. For the sake of simplification, not all the constituent elements of the system of automated distribution are represented in these figures.

FIG. 1A presents only:
the ends of four storage units (referenced A1 to A4) which are part of the automated storage depot and constitute four load-storing sources (storage containers);
a plurality of buffer devices (here below called source buffer devices) of the FIFO (First In First Out) type (referenced 11 to 14) and each placed immediately downstream from one of the four storage units A1 to A4; and
a main collector 15 (consisting for example of one or more conveyors) conveying the storage containers exiting the source buffer devices 11 to 14 up to the customer-order preparing station. The main collector 15 is therefore used to de-localize the customer-order preparing station relative to the automated storage depot. Indeed, the buildings do not always make it possible to place a customer-order preparing station beside the storage depot.

FIG. 1C presents only:
the main collector 15;
the customer-order preparing station 16 comprising a secondary collector (formed for example by one or more conveyors) and constituting a destination receiving loads (storage containers); and
a buffer device (here below called a destination buffer device) of the FIFO-type (referenced 17), placed upstream to the customer-order preparing station 16.

In this example, it is assumed that the customer order lists eight loads in a given sequential order corresponding to the rising sequential order of references 1 to 8 which the loads carry in the figures. In other words, the customer-order preparing station 16 must receive these eight loads in the sequential order of 1 to 8.

It is also assumed that the loads referenced 3 and 6 are stored in the storage unit referenced A1, the loads referenced 1 and 2 are stored in the storage unit referenced A2, the loads referenced 4 and 7 are stored in the storage unit referenced A3, and the loads referenced 5 and 8 are stored in the storage unit referenced A4.

To process the above-mentioned customer order, the control system carries out a first "intra-source" sequencing" (sequencing before the exit from the sources) in commanding each of the sources (storage units) A1 to A4 so that the loads of the customer order that are stored therein exit according to the given sequential order. Thus, as illustrated in FIG. 1A, the source buffer device 11 (placed downstream from the storage unit A1) successively receives the loads referenced 3 and 6. The source buffer device 12 (placed downstream relative to the storage unit A2) successively receives the loads referenced 1 and 2. The source buffer device 13 (placed downstream relative to the storage unit A3) successively receives the loads referenced 4 to 7. The source buffer device 14 (placed downstream relative to the storage unit A4 ) successively receives the loads referenced 5 and 8.

Then, the control system carries out a second "inter-source sequencing" (sequencing after the exit from the sources) in commanding the plurality of source buffer devices 11 to 14 so that the loads listed in the customer order are placed on the main collector 15 according to the given sequential order. There is therefore a high constraint of synchronization between the exits from the sources (storage units). For example, even if it is ready to exit the source buffer device 13, the load referenced 4 cannot be placed on the main collector 15 to be transmitted to the order-preparing station 16 so long as the loads referenced 1, 2 and 3 are not placed (in this sequential order) on the main collector 15.

FIG. 1B illustrates the loads referenced 1 to 8 being transported by the main collector 15 after having been placed in the desired sequential order (1 to 8).

Finally, as illustrated in FIG. 1C, the control system commands the destination buffer device 17 so that the loads (which enter therein already sorted out in the desired sequential order) can exit at the desired rate in order to be presented to the customer-order preparing station 16.

The present technique enables the simultaneous processing of several customer orders if each of them is intended for a distinct customer-order preparing station. As mentioned here above, one major drawback of the known technique illustrated in FIGS. 1A to 1C, is that there is a high constraint of synchronization between the exits of the sources (storage units). The sources therefore cannot work at a different rate and on different customer orders. Delay on the part of one source delays the others. In addition, the rate of filling of the main collector is not optimal.

Another drawback of the prior-art technique is that, when there are several destinations (preparing stations), they are not independent of each other. Indeed, when several customer orders, intended for different preparing stations, are processed simultaneously, a hitch relating to one destination (one preparing station) disturbs the other destinations. If the loads present on the main collector cannot be placed on the buffer destination device placed in front of a given destination (preparing station), then the other loads are blocked on the main collector. Similarly, a variation in the rate of one destination can block or disturb the rate of the other destinations.

SUMMARY OF THE INVENTION

One particular embodiment of the invention proposes a system of automated distribution comprising sources storing loads, at least one destination receiving loads and a control system adapted to processing customer orders. The system of automated distribution furthermore comprises a first common transportation system for the transportation of the loads exiting the sources; and, downstream from the first common transportation system and, upstream to each destination and associated with each destination, at least one plurality of first FIFO-type buffer devices, each dual to one of the sources. To process a given customer order listing loads that have to be extracted from the sources and provided in a given sequential order to a given destination, the control system is adapted to:

carrying out a first sequencing by commanding each source so that the loads of the given customer order, stored in said source, exit said source according to the given sequential order;

carrying out a second sequencing:
by routing each of the loads of the given customer order, exiting the first common transportation system coming from a given source, towards the first buffer device associated with the given destination and dual to the given source; and
by commanding the plurality of first buffer devices associated with a given destination so that the loads listed in the given customer order exit towards the given destination according to the given sequential order, or by providing an operator situated at the given destination, via a man-machine interface, with information for taking, according to the given sequential order, the loads listed in the given customer order in the first buffer devices associated with a given destination.

The general principle of the invention therefore consists in combining a first "intra-source" sequencing (sequencing before the exit from the sources) and a second "inter-source" sequencing (sequencing after the exit from the sources), as in the prior-art technique. However, unlike in the known technique the second "inter-source" sequencing according to the proposed technique is done not by commanding a plurality of FIFO-type buffer devices (referenced 11 to 14 in FIG. 1A) each placed immediately downstream to one of the sources, but by commanding a plurality of FIFO-type first buffer devices associated with and placed upstream to each destination.

Thus, this wholly novel and inventive approach removes the constraint existing in the prior art of synchronization between the exits of the sources. In other words, there is a de-synchronization of the exits from the sources which can work at different work rates and on different customer orders. The delaying of one source does not delay the other sources. Anticipation is thus possible.

Each source works at the rate of the customer orders and is not limited by that of the sequencing operations which are carried out at destination. Performance is thereby improved.

In addition, an efficient sizing of the first buffer device associated with each destination can cover (mask) the reaction time of the system of automated distribution, including its fluctuation.

Another advantage of the proposed technique is that, if there are several destinations, they are independent of each other (and therefore do not disturb each other) since each destination cooperates with its own plurality of first buffer devices.

In one particular (and non-restrictive) embodiment, each destination is a customer-order preparing station and each source is part of a storage depot (for example a storage unit), a storage depot or again or a group of storage depots.

According to one particular aspect of the invention, the system of automated distribution comprises, associated with at least one same given destination, at least two pluralities of FIFO-type first buffer devices, each dual to one of the sources. Furthermore, to simultaneously process at least two customer orders listing loads that have to be provided to a same given destination, each plurality of first buffer devices is used, in the context of the second sequencing, for the processing of a distinct customer order among said at least two customer orders.

Thus, it is possible to simultaneously process several customer orders intended for the same destination.

According to one particular characteristic, the system of automated distribution comprises:
a second FIFO-type buffer device placed immediately downstream from each source and upstream to each common transportation system; and/or
a third FIFO-type buffer device placed immediately upstream to each destination and downstream from the first common transportation system.

The second buffer devices (here below called source buffer devices) and the third buffer devices (here below called destination buffer devices) reduce the reaction time of the entire distribution system According to a first particular implementation, the system of automated distribution comprises at least two destinations, each associated with at least one plurality of first buffer devices, and the first common transportation system transports the loads between the sources and the pluralities of the first buffer devices associated with the destinations.

Thus, the proposed technique is compatible with the implementing of a first common transportation system, used to de-localize the first buffer devices (and therefore also the destinations) relative to the sources. Through the novel and inventive approach mentioned here above, this first common transportation system is better used (with an increased filling rate) than in the prior art.

Advantageously, the control system is adapted so that, upon detection of an unoccupied place in one of the first buffer devices associated with a given destination, it activates an exit order so that a load, intended for said first buffer device, exits the source to which said first buffer device is dual, or exits a FIFO-type buffer device placed immediately downstream to the source, to which said first buffer device is dual, the load that has exited being taken charge of by said first common transportation system.

This rule ensures that, even in the event of a problem in a given destination, a load transmitted by a given source towards this given destination can always be discharged into the first buffer device, placed upstream to said given destination and dual to this given source. This load will not generate the use of the first common transportation system for the loads intended for other destinations.

Advantageously, at least for a first given buffer device, the control system is adapted to delivering a number of exit orders greater than the number of unoccupied places in said given buffer device.

In other words, a slight relaxation of the above-mentioned rule is accepted. The release of N places in the first buffer device is anticipated in taking a very slight risk. N is for example equal to 1 or 2, or even more depending on the configuration of the system.

Advantageously, the system of automated distribution comprises at least one destination each associated with at least one plurality of first buffer devices and it comprises a second common transportation system for the transportation of loads between the destinations and the plurality of first buffer devices associated with the destinations.

Thus, the proposed technique is compatible with the implementing of a second common transmission system to delocalize the first buffer devices relative to the destinations.

Advantageously, the control system is adapted to carrying out a dynamic allocation of the first buffer devices among the destinations, as a function of the destination effectively used.

In this way, the use of the first buffer devices is optimized. This makes it possible for example to increase the number of customer orders, intended for a same destination, that can be processed simultaneously.

According to a second particular embodiment, the system of automated distribution comprises at least two destinations, each associated with at least one plurality of first buffer devices, and it comprises, in or for each source, an elevator enabling loads to be brought out of said source on several levels, towards first buffer devices that are:
  each dual to said source,
  each associated with a distinct destination, and
  each located at a distinct level among said levels.

This second particular implementation makes it possible to simultaneously process several customer orders, without a common transportation system.

In another embodiment of the invention, a method is proposed for processing a customer order by means of a control system for controlling a system of automated distribution, said system of automated distribution comprising sources storing loads, a first common transportation system for the transportation of loads exiting the sources and at least one destination receiving loads, said method comprising the following steps to process a given customer order listing loads that have to be extracted from the sources and provided in a given sequential order to a given destination:
  the control system carries out a first sequencing, in commanding each source so that the loads of the given customer order, stored in said source, exit said source in compliance with the given sequential order;
  the control system carries out a second sequencing:
    in routing each of the loads of the given customer order exiting the first common transportation system coming from a given source, towards a buffer device associated with the given destination and dual to the given source, a plurality of FIFO-type buffer devices being associated with and situated upstream to each destination and each being dual to one of the sources, said plurality of FIFO-type buffer devices being situated downstream from the first common transportation system; and
    in commanding the plurality of buffer devices associated with the given destination so that the loads listed in the given customer order exit towards the given destination according to the given sequential order, and in providing an operator situated at the given destination, via a man-machine interface, with the information for taking, according to the given sequential order, the loads listed in the given customer order in the buffer devices associated with the given destination.

Another embodiment of the invention proposes a computer program product comprising program code instructions for implementing the above-mentioned method (in any of its different embodiments) when said program is executed on a computer.

Another embodiment of the invention proposes a computer-readable and non-transient storage medium storing a computer program comprising a set of instructions executable by a computer to implement the above-mentioned method (in any one of its different embodiments).

LIST OF FIGURES

Other features and advantages of the invention shall appear from the following description given by way of an indicative and non-exhaustive example and from the appended drawings, of which.

DETAILED DESCRIPTION

In all the figures of the present document, the identical elements and steps are designated by a same numerical reference.

Referring to FIGS. 2A to 2D and 6, a technique is now presented for processing a customer order by means of a control system in a system of automated distribution according to a first embodiment of the invention.

By way of an example, it is assumed that the system of automated distribution is used for the preparation of parcels and comprises:
  an automated storage depot containing products in storage containers (these storage containers are also called loads), each storage container being associated with a unique product reference;

a customer order-preparation station where the products are picked and placed by an operator in a parcel (also called a dispatch container);

a set of conveyors conveying the storage containers in which the products are located, from the storage depot to the customer order-preparation station and vice versa; and a control system or warehouse control system (WCS).

The automated storage depot and the control system are for example made as described in the patent FR 2 915 979 filed by the Applicant (see the summary of this technique further above).

For the sake of simplification, not all the constituent elements of the system of automated distribution are shown in FIGS. 2A to 2D.

Figure 2A:
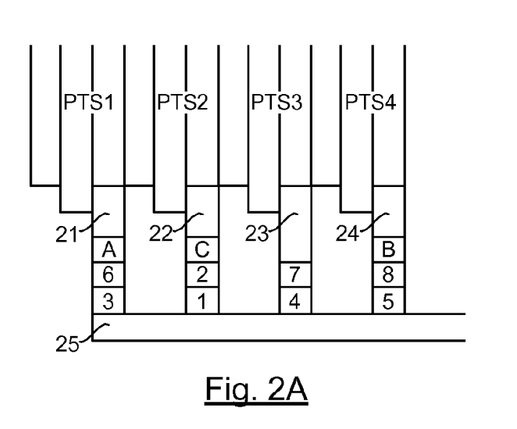
FIGS. 2A to 2D present a technique for processing a customer order by means of a control system in a system of automated distribution according to a first embodiment of the invention.

FIG. 2A presents solely:

the ends of four storage units (referenced PTS1 to PTS4), which are part of the automated storage depot and constitute four sources storing loads (storage containers);

a plurality of FIFO-type source buffer devices (referenced 21 to 24), each placed downstream from one of the four storage units PTS1 to PTS4. Each source buffer device is for example a conveyor or any other collecting or storage system; and a main collector (also called a transportation system and formed for example by one or more conveyors) conveying the storage containers exiting the source buffer devices 21 to 24 up to the customer-order preparing station. The main collector 25 therefore serves to delocalize the customer-order preparing unit relative to the automated storage depot. Indeed, the buildings are not always such that the customer-order preparing unit can be positioned beside the storage depot.

Figure 2B:
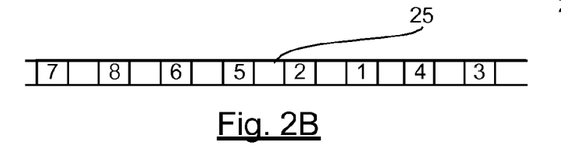
Figure 2C:
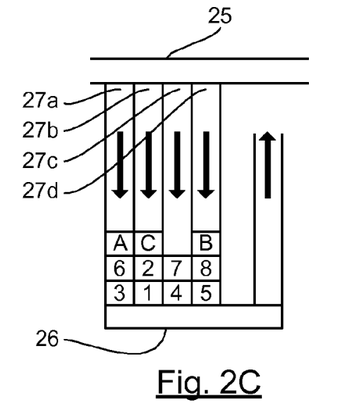
Figure 2D:
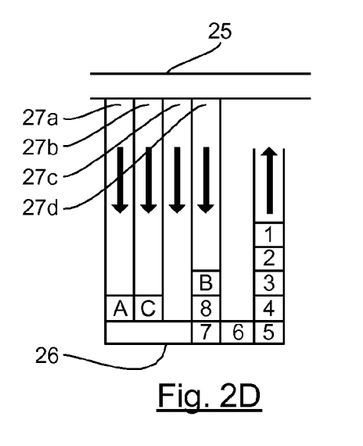

Each of the FIGS. 2C and 2D present only:

the main collector 25;

the customer-order preparing station 26 comprising a secondary collector (formed for example by one or more conveyors) and constituting a destination receiving loads (storage containers); and a plurality of FIFO-type destination buffer devices (referenced 27a to 27d) and placed upstream to the customer-order preparing station 26 each being dual to one of the four storage units (sources) PTS1 to PTS4. Each destination buffer device is for example a conveyor or any other collecting or storage system.

In this example (as in the example presented in FIGS. 1A to 1C), it is assumed that the customer order lists eight loads in a given sequential order corresponding to the rising sequential order of references 1 to 8 which carry these loads in the figures. In other words, the customer-order preparing unit 26 must receive these eight loads in the sequential order of 1 to 8.

It is also assumed that the loads referenced 3 and 6 are stored in the storage unit referenced PTS1, the loads referenced 1 and 2 are stored in the storage unit referenced PTS2, the loads referenced 4 and 7 are stored in the storage unit referenced PTS3, and the loads referenced 5 and 8 are stored in the storage unit referenced PTS4

To process the above-mentioned customer order, the control system carries out a first sequencing (step 61 of FIG. 6), in commanding each of the sources (storage units) PTS1 to PTS4 so that the loads of the customer order which are stored therein exit in accordance with the given sequential order. Thus, as illustrated in FIG. 2A, the source buffer device referenced 21 (placed downstream from the storage unit PTS1) successively receives the loads referenced 3 and 6. The source buffer device referenced 22 (placed downstream from the storage unit PTS2) successively receives the loads referenced 1 and 2. The source buffer device 23 (placed downstream from the storage unit PTS3) successively receives the loads referenced 4 and 7. The source buffer device referenced 24 (placed downstream to the storage unit PTS4) successively receives the loads referenced 5 and 8.

Then, the control system commands the plurality of source buffer devices 21 to 24 so that the loads listed in the customer order are placed on the main collector 25 as and when they arrive at the exit of the source buffer devices 21 to 24, without being concerned with the sequential order of placing in the customer order and therefore without constraints of synchronization between the exits from the sources (storage units) PTS1 to PTS4. Thus, the loads listed in the customer order are not placed on the main collector 25 according to the given sequential order. For example, if it is ready to exit the source buffer device 21, the load referenced 3 is placed on the main collector 25 in customer order to be transmitted to the customer-order preparing station 26 even if the loads referenced 1 and 2 have not yet been placed on the main collector 25.

FIG. 2B illustrates the loads referenced 1 to 8 in the course of transportation by the main collector 25 after they have been placed therein according to the following sequential order: 3, 4, 1, 2, 5, 6, 8, 7 (and not in the sequential order (1 to 8) of the customer order).

Then, the control system carries out a second sequencing (step 62 of FIG. 6) with a first phase (62a of FIG. 6) for routing each of the loads of the customer order, exiting from a given source (among PTS1 to PTS4) towards the destination buffer device (among 27a to 27d) situated upstream to the customer order preparing station 26 and dual to the given source. In the above-mentioned example, the load referenced 3 is routed towards the destination buffer device referenced 27a (dual to the source PTS1), the load referenced 4 is routed towards the destination buffer device referenced 27c (dual to the source PTS3), the load referenced 1 is shunted towards the destination buffer device 27b (dual to the source PTS2), etc. As illustrated in FIG. 2C, the destination buffer device referenced 27a (dual to the source buffer device referenced 21) successively receives the loads referenced 3 and 6. The destination buffer device referenced 27b (dual to the source buffer device referenced 22) successively receives the loads referenced 1 and 2. The destination buffer device referenced 27c (dual to the source buffer device referenced 23) successively receives the loads referenced 4 and 7. The destination buffer device referenced 27d (dual to the source buffer device referenced 24) successively receives the loads referenced 5 and 8. For each load, the routing is for example done by means for reading an identifier of the load (for example a barcode reader or an RFID label reader or even by using a tracking technique that cooperates with means (for example a roller conveyor) for shifting the load towards the desired destination buffer device (FIGS. 27a to 27d).

Again in the context of the second sequencing, and as illustrated in FIG. 2D, the control system in a second phase (step 62b of FIG. 6) commands the destination buffer devices 27a to 27d so that the loads emerge therefrom according to the sequential order of the customer order (from 1 to 8) to be presented to the customer-order preparing station 26.

In this variant of the second phase, the control system, via a man-machine interface (not shown), provides an operator situated at the customer-order preparing station 26 with information so that the operator, according to the sequential order of the customer order, takes the loads that are listed in the customer order and arrive at the destination buffer devices 27a to 27b situated before him.

Referring to FIGS. 3A to 3D, an example is now presented of a control of one of the storage units (sources) PTS1 to PTS4 by the control system in the context of the system of automated distribution of FIGS. 2A to 2D.

Each of the FIGS. 3A to 3D presents a longitudinal section of a storage unit (for example PTS1) comprising an lane serving on either side a storage rack 31 with several superimposed storage levels. Each shelf is sub-divided along its length into storage compartments (also called cells) 32 each intended for receiving a load (storage container). The lane receives, at each storage level, tracks for the moving of a shuttle (also called a transfer device or trolley) which shifts the loads, positions them inside the storage compartments and enables these loads to be picked from these locations.

The storage unit also comprises elevators 33, 34 (also called up/down elevators) which are laid out at one end of the lane and are used to carry the loads towards the storage racks (with a view to their storage inside the storage compartments) or to remove the loads out of the storage racks (with a view to their transfer to a source buffer device (referenced 21 in the case of the storage unit PTS1). For example, one elevator is used for the entry of loads into the storage racks, and the other elevator is used for the exit of loads out of the storage racks. A third elevator (not shown) or else one of the two elevators mentioned here above (entry or exit) can be used to move the shuttles from one level to another of the lane.

In the example of FIGS. 3A to 3D, each rack comprises, at each level, a buffer zone 35 in which the loads are conveyed and stored temporarily before being evacuated (towards the source buffer device referenced 21) by one of the elevators.

By way of an example (which differs from the example presented in FIGS. 2A to 2D), it is considered that the customer order lists twelve loads in the following sequential order: 1, 1', 2', 2, 3, 3', 4', 5', 4, 5, 6, 6'. It is also assumed that the loads referenced 1 to 6 are stored in the storage unit referenced PTS1 and the loads referenced 1' to 6' are stored in the storage unit referenced PTS2.

It can be recalled (see here above the description of FIG. 2A) that, to process a customer order, the control system carries out a first sequencing in commanding each of the storage units (sources) PTS1 to PTS4 so that the loads of the customer order that are stored therein exit according to the given sequential order.

FIGS. 3A to 3D illustrate four successive steps of this first sequencing for the storage unit PTS1.

Figure 3A:
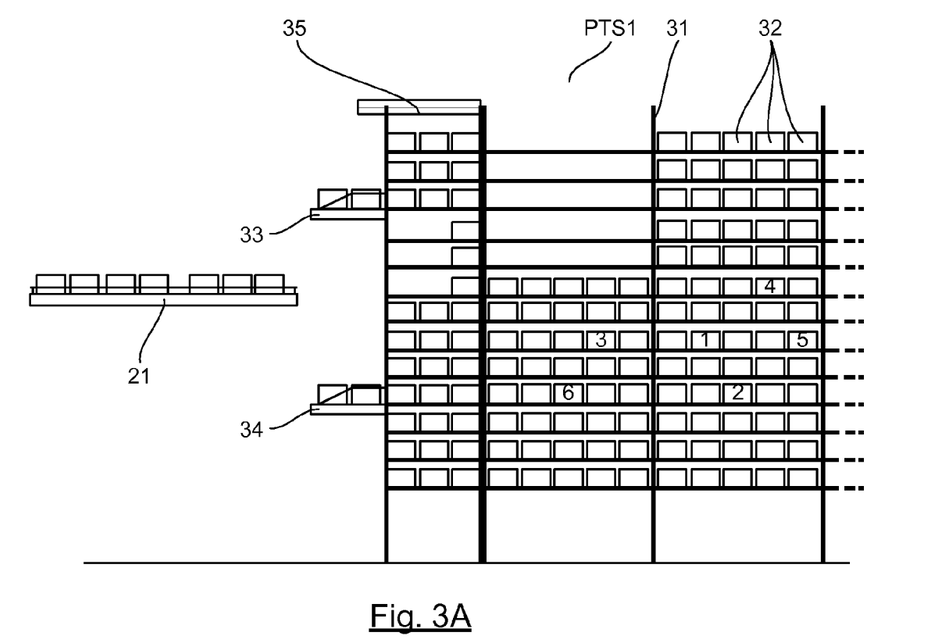
FIGS. 3A to 3D illustrate an example of the commanding of one of the sources by means of the control system in the context of the system of automated distribution of FIGS. 2A to 2D.

At a first step illustrated in FIG. 3A, according to the customer order to be processed, the control system chooses the loads (loads referenced 1 to 6 in the example considered) to bring out of the storage unit PTS1 and assigns tasks to the different elements of the storage unit according to the location of these loads in the racks 31, the availability of the shuttles and of the elevators as well as the sequential order in which these loads must exit the storage unit PTS1.

Figure 3B:
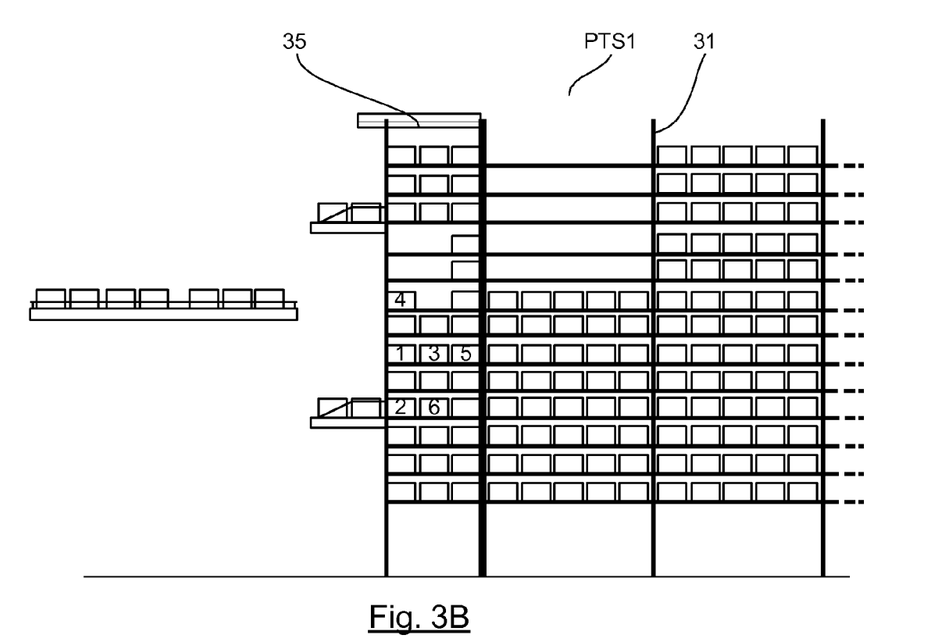

At a second step illustrated in FIG. 3B, the shuttles perform tasks in the sequential order given by the control system and the loads referenced 1 to 6 collect in the buffer zone 35 at the different levels of the racks 31.

Figure 3C:
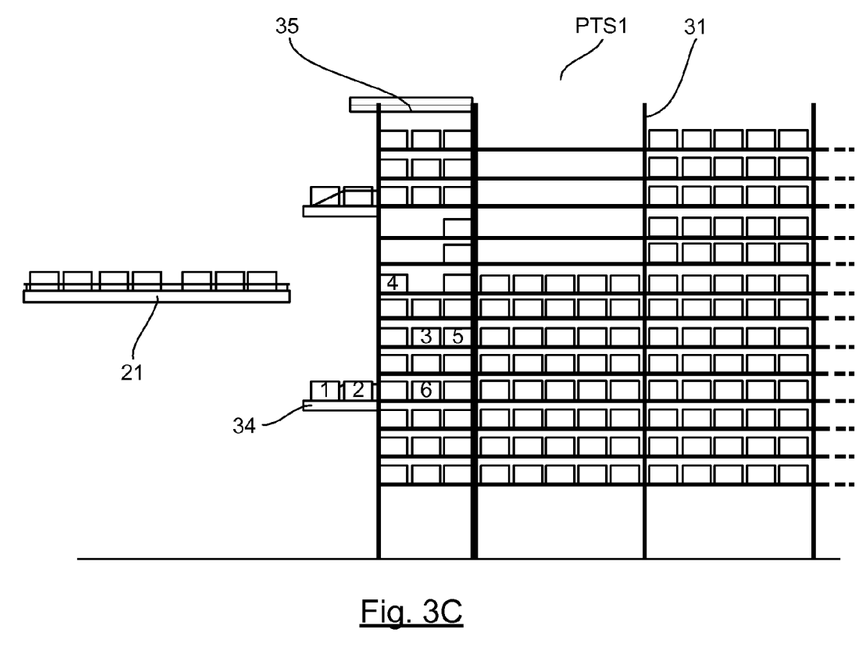

At a third step illustrated in FIG. 3C, the elevator referenced 34 performs tasks in the sequential order given by the control system. The elevator is a sorter that carries out the sequencing of the loads. In FIG. 3C, the elevator starts by bringing out the load s referenced 1 and 2.

Figure 3D:
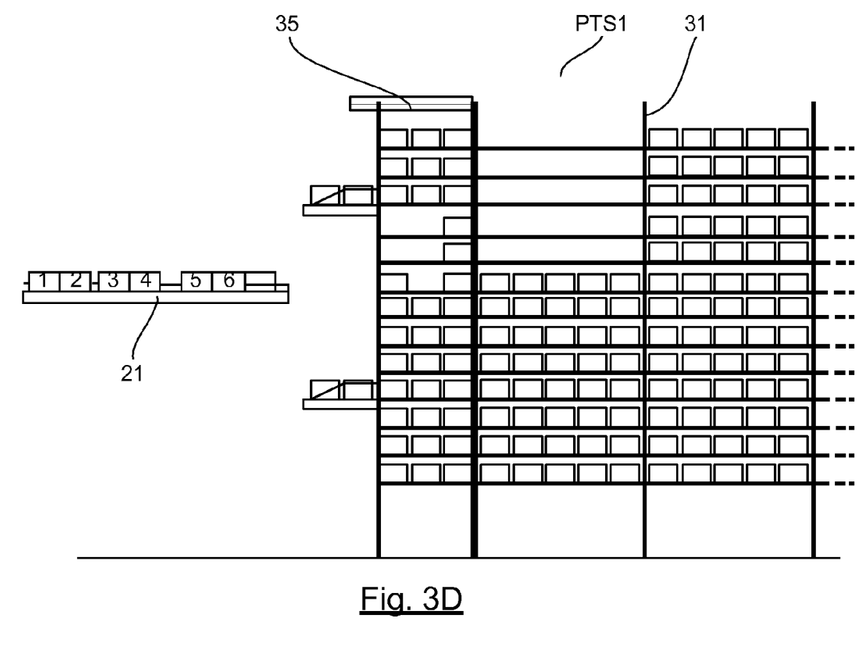

At a fourth step illustrated in FIG. 3D, the control system has finished placing all the loads (referenced 1 to 6), hitherto stored in the storage unit referenced PTS1, in the source buffer device referenced 21 according to the desired sequential order.

Referring to FIGS. 4A to 4D, a technique is now presented for processing a customer order by means of a control system in a system of automated distribution according to a second embodiment of the invention.

This second embodiment is differentiated from the first embodiment in that the system of automated distribution comprises:
  a second customer order preparing unit (referenced 26') in addition to the one (the first one) referenced 26 in the first embodiment; and
  a plurality of FIFO-type destination buffer devices (referenced 27a' to 27d') placed upstream to the second customer order preparing unit 26' and each being dual to one of the four storage units (source) PTS1 to PTS4.

In this case, the main collector is a common transportation system of the transportation of loads between the storage units PTS1 to PTS4 and the two pluralities of destination buffer devices (referenced 27a to 27d and 27a' to 27d').

In this example, it is assumed that a first customer order intended for the first customer-order preparing station (referenced 26) lists eight loads (referenced, in sequential order, 1 to 8) and that a second customer order, intended for the second customer order preparing station (referenced 26,') lists four loads (referenced, in sequential order, A to D).

It is also assumed that the loads referenced 3 and 6 of the first customer order and the loads referenced A and D of the second customer order are stored in the storage units referenced PTS1, the loads referenced 1 and 2 of the first customer order and the load referenced C of the second customer order are stored in the storage units referenced PTS2, the loads referenced 4 and 7 of the first customer order are stored in the storage shelves referenced PTS3, the loads referenced 5 and 8 of the first customer order and the load referenced B of the second customer order are stored in the storage units referenced PTS4.

Figure 4A:
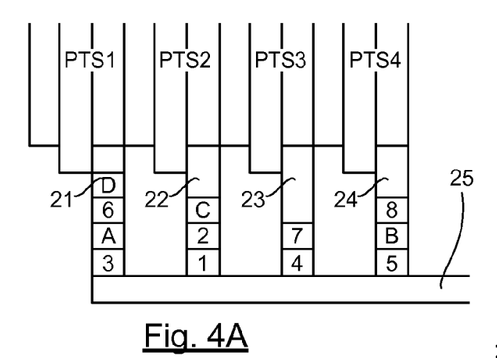
FIGS. 4A to 4D present a technique for the processing of a customer order by means of a control system a system of automated distribution according to a second embodiment of the invention.

To simultaneously process the first and second customer orders mentioned here above, the control system carries out a first sequencing, by commanding each of the sources (storage units) PTS1 to PTS4 so that the loads of the first and second customer orders, which are stored therein, exit in accordance with the given sequential order, for each of the customer orders. Thus, as illustrated in FIG. 4A, the source buffer device referenced 21 (placed downstream from the storage unit PTS1) successively receives the loads referenced 3, A, 6 and D. The source buffer device referenced 22 (placed downstream from the storage unit PTS2) successively receives the loads referenced 1, 2 and C. The source buffer device referenced 23 (placed downstream from the storage unit PTS3) successively receives the loads referenced 4 and 7. The source buffer device referenced 24 (placed downstream from the storage unit PTS4) successively receives the loads referenced 5, B and 8.

Then the control system commands the plurality of source buffer devices 21 to 24 so that the loads listed in the first and second customer orders are placed on the main collector 25 as and when they arrive at the exit from the source buffer devices 21 to 24, without being concerned with the sequential order of placing in each customer order (or a sequential order between the two customer orders) and therefore without constraints of synchronization between the exits of the sources (storage units) PTS1 to PTS4.

In one particular embodiment, upon detection of an unoccupied place in the given destination buffer device (among those referenced 27a to 27d and situated upstream to the first customer-order preparing station 26, and those referenced 27a' to 27d' situated upstream to the second customer-order preparing station 26'), the control system activates an exit order so that a load intended for the given destination buffer device exits that source (among PTS1 to PYS4) to which the given destination buffer device is dual, or exits that source buffer device (among 21 to 24) placed immediately downstream from the source) to which the source buffer device is dual. The outgoing load is taken charge of by the main collector 25 (common transportation system).

In one variant, for each given destination buffer device (among 27a to 27d and 27a' to 27d'), the control system is adapted to delivering a number of exir orders greater, by one or two units, than the number of unoccupied places in this given destination buffer device.

Figure 4B:
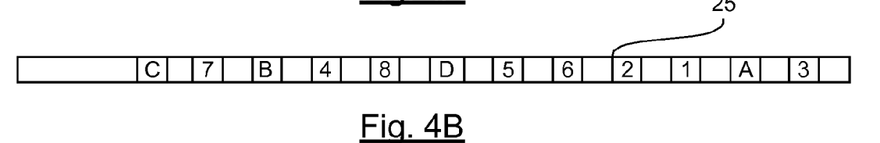

FIG. 4B illustrates the loads referenced 1 to 8 and A to D being transported by the main collector 25, after having been placed therein in the following sequential order: 3, A, 1, 2, 6, 5, D, 8, 4, B, 7 and C.

Figure 4C:
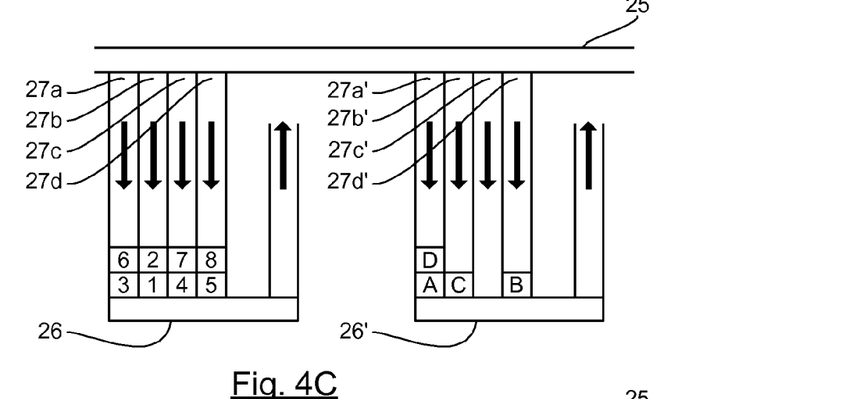

Then the control system carries out a second sequencing:
  in routing each of the loads of the first customer order, exiting a given source (among PTS1 to PTS4), towards the destination buffer device (among 27a to 27d) situated upstream to the first customer-order preparing station 26 and dual to the given source, and
  in routing each of the loads of the second customer order, exiting a given source (among PTS1 to PTS4), towards the destination buffer device (among 27a' to 27d') situated upstream to the second customer-order preparing station 26' and dual to the given source, and As illustrated in FIG. 4C, the destination buffer device referenced 27a (dual to the source buffer device referenced 21) successively receives the loads referenced 3 and 6. The destination buffer device referenced 27b (dual to the source buffer device referenced 22) successively receives the loads referenced 1 and 2. The destination buffer device referenced 27c (dual to the source buffer device referenced 23) successively receives the loads referenced 4 and 7. The destination buffer device referenced 27d (dual to the source buffer device referenced 24) successively receives the loads referenced 5 and 8. The destination buffer device referenced 27a' (dual to the source buffer device referenced 21) successively receives the loads referenced A and D. The destination buffer device referenced 27b' (dual to the source buffer device referenced 22) receives the load referenced C. The destination buffer device referenced 27d' (dual to the source buffer device referenced 24) receives the load referenced B.

Figure 4D:
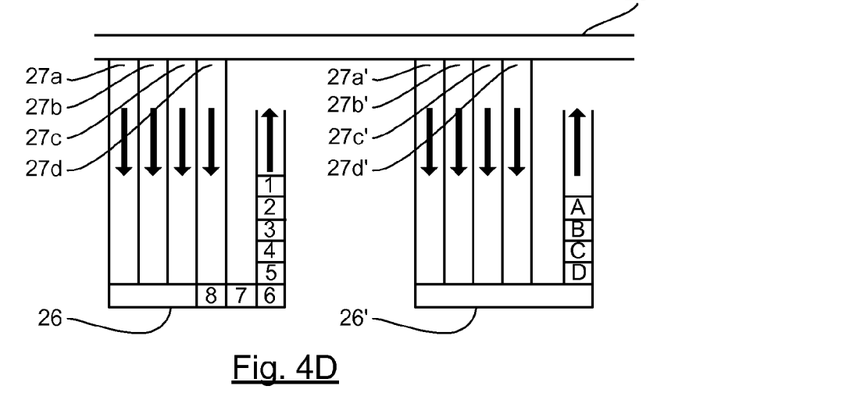

Again in the context of the second sequencing, and as illustrated in FIG. 4D, the control system commands (in a second phase), the destination buffer devices 27a to 27d so that the loads exit therefrom in the sequential order of the first customer order (from 1 to 8), to be presented to the first customer-order preparing station 26, and commands the destination buffer devices 27a' to 27d' so that the loads exit therefrom in the sequential order of the second customer order (from A to D), to be presented to the second customer-order preparing station 26'.

In one variant of this second phase, the control system provides the following, via a man-machine interface (not shown):
  to a first operator located at the first customer-order preparing station 26: it provides information so that, following the sequential order of the first customer order, this first operator picks the loads that are listed in the first customer order and arrive in the destination buffer devices 27a to 27d situated before him; and; and
  to a second operator located at the second customer-order preparing station 26': it provides information so that, following the sequential order of the second customer order, this second operator picks the loads that are listed in the second customer order and arrive at the destination buffer devices 27a' to 27d' situated before him.

Figure 5:
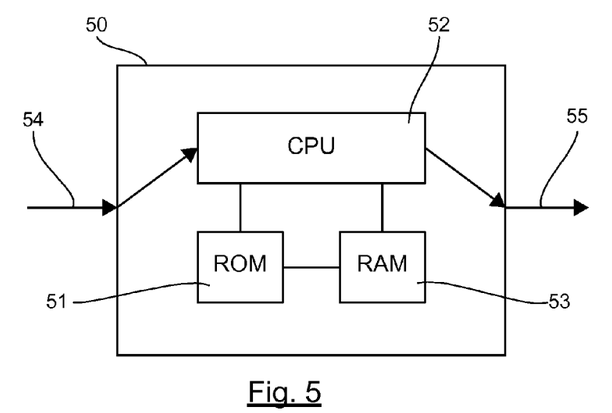
FIG. 5 presents the structure of a control system according to one particular embodiment of the invention.
Figure 6:
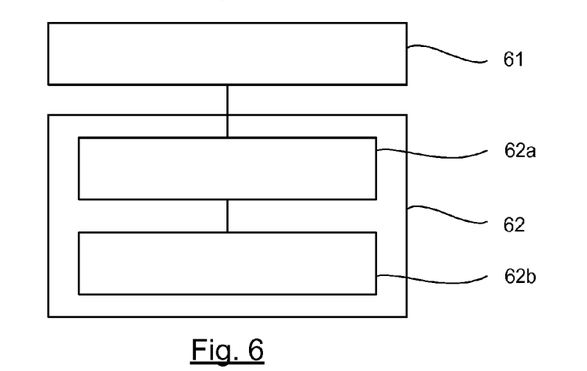
FIG. 6 presents a simplified flowchart of the method implemented by the control system in a first embodiment of the invention illustrated in FIGS. 2A to 2D.

FIG. 5 presents the simplified structure of a control system 50 according to one particular embodiment of the invention. This control system comprises a RAM 53, a central processing unit (CPU) 52, equipped for example with a processor and driven by a computer program stored in a ROM 51. At initialization, the code instructions of the computer program are, for example, loaded into the RAM 53 and then executed by the processor of the processing unit 52, to implement the technique for processing a customer order according to the first embodiment of the invention (see FIGS. 2A to 2D and 3A to 3D), the second embodiment of the invention (see FIGS. 4A à 4D), the third embodiment of the invention (see FIG. 7), the fourth embodiment (see FIG. 8) or the fifth embodiment (see FIG. 9). The processing unit 52 inputs one or more customer orders 54 (each being intended for one destination among one or more destinations; several customer orders being capable of simultaneous processing if they are intended for different destinations). The processor of the central processing unit 52 processes the customer order or customer orders 54 and generates instructions or commands 55 at output enabling the driving (or control) of different elements included in the system of automated distribution, especially:
  the storage units PTS1 to PTS4 (themselves comprising shuttles, elevators, conveyors, etc.);
  the FIFO-type source buffer devices (referenced 21 to 24) and each placed downstream relative to one of the four storage units PTS1 to PTS4;
  the main collector (referenced 25), formed for example by one or more conveyors;
  the customer-order preparing station or stations (referenced 26 and 26'), each comprising a secondary collector;
  the FIFO-type destination buffer devices (referenced 27a to 27d and 27a' to 27d'), each being placed upstream to a customer-order preparing station 26, 26' and being dual to one of the four storage units PTS1 to PTS4.

This FIG. 5 illustrates only one particular way, among several possible ways, of carrying out the technique of the invention, in any one of its embodiments. Indeed, the control system is carried out equally well:
  on a reprogrammable computing machine (a personal computer (PC), a DSP or a microcontroller) executing a program comprising a sequence of instructions, or
  on a dedicated computing machine (for example a set of logic gates such as an FPGA or an ASIC, or any other hardware module).

Should the control system be made with a reprogrammable computing machine, the corresponding program (i.e. the sequence of instructions) can be stored in a detachable storage medium (such as for example a floppy disk, a CD-ROM or a DVD-ROM) or non-detachable storage medium, this storage medium being partially or totally readable by a computer or a processor.

Figure 7:
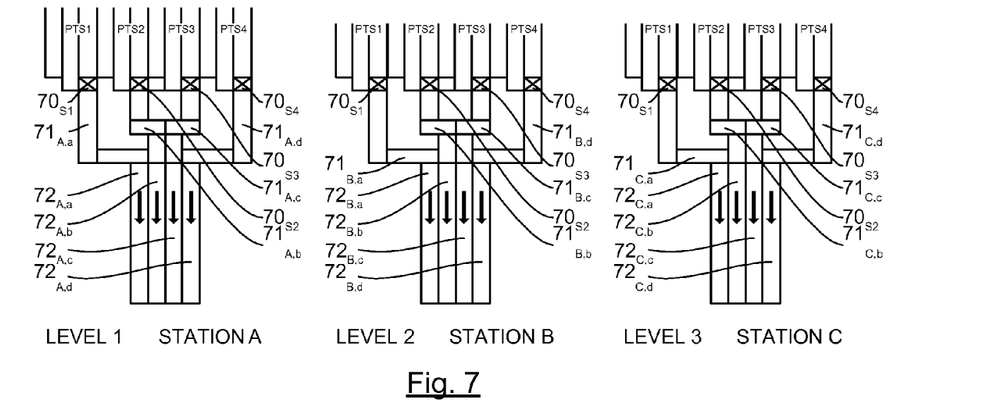
FIG. 7 presents a technique for the processing of a customer order by means of a control system in a system of automated distribution according to a third embodiment of the invention.

Referring now to FIG. 7, a technique is presented for processing a customer order by means of a control system in a system of automated distribution according to a third embodiment of the invention.

In this example, the distribution system comprises four storage units (referenced PTS1 to PTS4), that form part of an automated storage depot and constitute four sources storing loads. Each of these sources PTS1 to PTS4 comprises an elevator $70_{s1}$ to $70_{s4}$ used to take out the loads (from the source concerned) on three levels (called level 1, level 2 and level 3 here below).

Each part of FIG. 7, namely the left-hand, central and right-hand parts, has one of these three levels. For each level, the distribution system comprises:
- a customer-order preparing station (here below called stations A, B and C for the levels 1, 2 and 3 respectively);
- a plurality of FIFO-type destination buffer devices (referenced $72_{A,a}$ to $72_{A,d}$ for the level 1, $72_{B,a}$ à $72_{B,d}$ for the level 2 and $72_{C,a}$ à $72_{C,d}$ for the level 3), placed upstream to the customer-order preparing station (station A, B or C) of the level concerned, and each dual to one of the four sources PTS1 to PTS4. Each destination buffer device is for example a conveyor or any other collecting or storage system.
- a plurality of intermediate collectors (referenced $71_{A,a}$ to $71_{A,d}$ for the level 1, $71_{B,a}$ to $71_{B,d}$ for the level 2 and $71_{C,a}$ à $71_{C,d}$ for the level 3) (each formed for example by one or more conveyors), each placed upstream to one of the destination buffer devices.

To simultaneously process several customer orders, the control system carries out a first sequencing: for a given customer order (that lists loads having to be extracted from the sources and provided in a given sequential order to a given destination), it commands each of the sources PTS1 to PTS4 so that the loads of this customer order which are stored therein exit in compliance with the given sequential order, and on the level at which the given destination is located. This is done without being concerned with the sequential order of placing in the customer order and therefore without any constraints of synchronization between the exits from the sources PTS1 to PTS4.

The choice of the right level constitutes a routing, equivalent to the first phase of the second sequencing in the embodiments described further above. Then, the control system carries out a second phase of the second sequencing: for the given customer order, it commands the plurality of the intermediate collectors and the plurality of destination buffer devices of the level at which the given destination is situated so that the loads arrive, according to the given sequential order, to the customer-order preparing station situated at this level.

In one variant of this second phase, the control system, via a man-machine interface (not shown), provides an operator situated at the customer-order preparing station with information so that this operator, following the sequential order of the customer order, takes the loads that are listed in the customer order and that arrive in the destination buffer devices situated before him.

Figure 8:
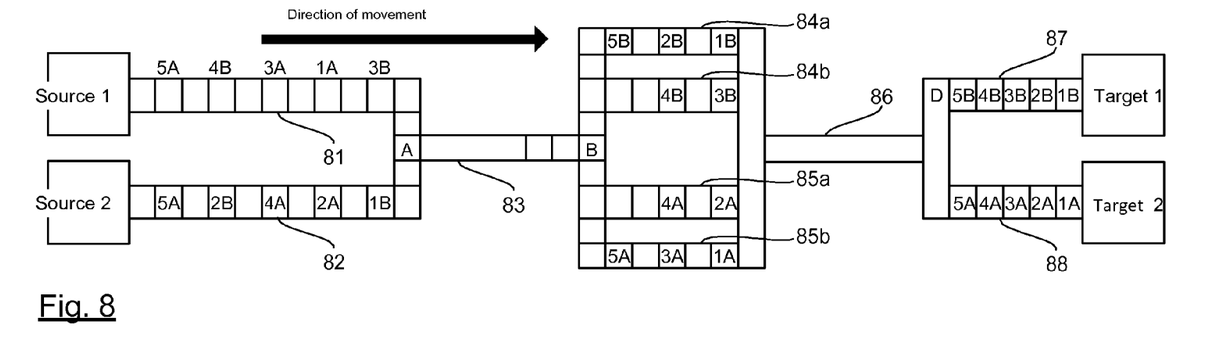
FIG. 8 presents a technique for the processing of a customer order by means of a control system in a system of automated distribution according to a fourth embodiment of the invention.

Referring now to FIG. 8, a technique is presented for processing a customer order by means of a control system, in a system of automated distribution according to a fourth embodiment of the invention.

In this example, the distribution system comprises:
- two sources (referenced source 1 and source 2);
- immediately downstream from each source, a FIFO-type source buffer device 81 and 82;
- a first main collector section 83 (common transportation system), receiving loads exiting from the source buffer devices 81 and 82;
- two pluralities of FIFO-type intermediate buffer devices, placed in parallel and downstream from the main collector section 83. The first plurality comprises devices 84a and 84b, each dual to one of the two sources and used to sort out the loads of each customer order intended for the first destination (target 1). The second plurality comprises two intermediate buffer devices 85a and 85b, each dual to one of the two sources and used to sort out the loads of each customer order intended for the second destination (target 2);
- a second main collector section, placed downstream from the plurality of destination buffer devices;
- immediately upstream to each destination, a FIFO-type destination buffer device;
- two destinations (referenced target 1 and target 2).

In the example illustrated in FIG. 8, it is assumed that the following two customer orders must be processed simultaneously (one customer order for each destination):
- a first customer order listing five loads denoted (in the sequential order of the first customer order) as: 1B, 2B, 3B, 4B and 5B. This customer order is intended for the first destination (target 1); and
- a second customer order listing five loads denoted (in the sequential order of the first customer order) as: 1A, 2A, 3A, 4A and 5A This customer order is intended for the second destination (target 2).

FIG. 2 represents the loads of these two customer orders at three different instants.

At a first instant, following a first sequencing, the loads are brought out from the sources and are situated in the source buffer devices 81 and 82. More specifically, following the first sequencing performed by the control system, the loads have been brought out of the sources according to the sequential order of each customer order (by contrast, there is not yet any sequencing between customer orders). Thus, the source buffer device 81 has successively received the loads 3B, 1A, 3A, 4B and 5A (3B and 4B are in the sequential order of the second customer order, and 1A, 3A and 5A are in the sequential order of the first customer order). The source buffer device 82 has successively received the loads 1B, 2A, 4A, 2B and 5B (1B, 2B and 5B are in the sequential order of the second customer order, and 1A, 3A and 5A are in the sequential order of the second customer order).

At a second instant, following a first phase of a second sequencing, each of the loads (exiting a given source and being directed towards a given destination) has been routed towards the intermediate buffer device associated with the given destination and dual to the given source. Thus, for the first customer order, the intermediate buffer device 84a has successively received the loads 1B, 2B and 5B, and the intermediate buffer device 84b has successively received the loads 3B and 4B. For the second customer order, the intermediate buffer device 85a has successively received the loads 2A and 4A, and the intermediate buffer device 85b has successively received the loads 1A, 3A and 5A.

At a third instant, following a second phase of the second sequencing, the loads have, for each customer order, been placed on the second main collector section according to the sequential order of this customer order. Then, at the exit from the second main collector section 86, the loads have been routed towards the appropriate destination. Thus, for the first customer order, the destination buffer device 87 has successively received the loads 1B, 2B, 3B, 4B and 5B. For the second customer order, the destination buffer device 88 has successively received the loads 1A, 2A, 3A, 4A and 5A.

In one particular implementation, the control system is adapted to making a dynamic allocation of the intermediate buffer devices 84a, 84b, 85a and 85b among the destinations, according to the destination or destinations effectively used. For example, if the first destination (target 1) is not used, all the intermediate buffer devices 84a, 84b, 85a and 85b are used for the second destination (target 2), and this enables, for example, the simultaneous processing of two customer orders intended for this second destination.

Figure 9:
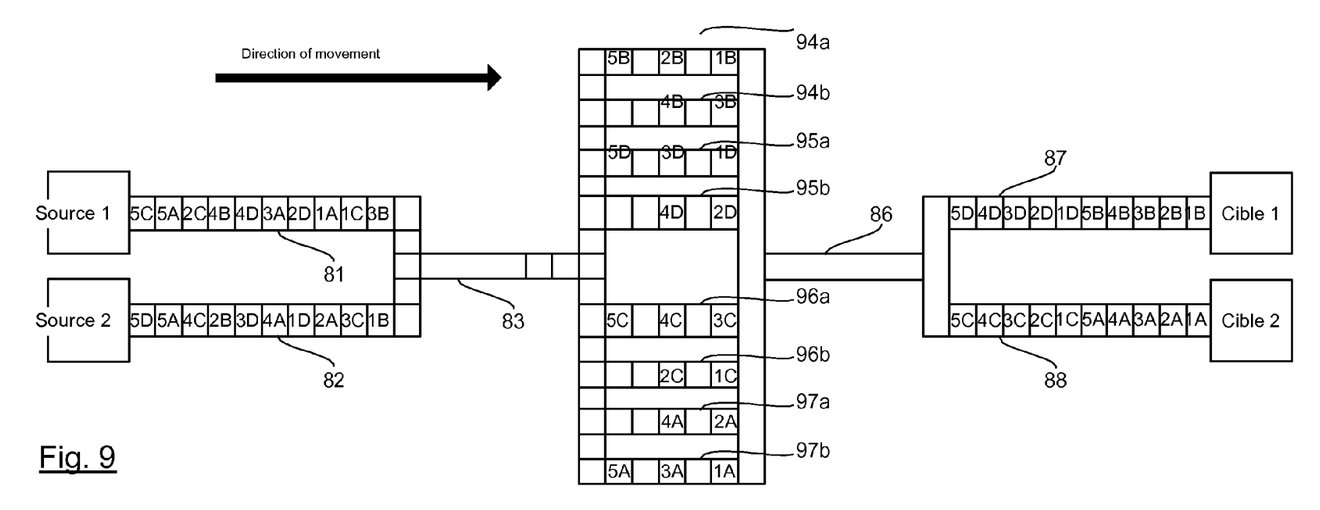
FIG. 9 presents a technique for the processing of a customer order by means of a control system in a system of automated distribution according to a fifth embodiment of the invention.

Referring now to FIG. 9, a technique is presented for processing a customer order by means of a control system, in a system of automated distribution according to a fifth embodiment of the invention This fifth embodiment is differentiated from the fourth (illustrated in FIG. 8) in that the system of automated distribution comprises not two but four pluralities of FIFO-type intermediate buffer devices, placed in parallel and downstream from the first main collector section 83:
- the first plurality comprises two intermediate buffer devices 94a and 94b, each dual to one of the two sources and used to sort the loads of a first customer order intended for the first destination (target 1);
- the second plurality comprises two intermediate buffer devices 95a and 95b, each dual to one of the two sources and used to sort the loads of a second customer order intended for the first destination (target 1);
- the third plurality comprises two intermediate buffer devices 96a and 96b, each dual to one of the two sources and used to sort the loads of a third customer order intended for the second destination (target 2);
- the fourth plurality comprises two intermediate buffer devices 97a and 97b, each dual to one of the two sources and used to sort the loads of a fourth customer order intended for the second destination (target 2).

In the example illustrated in FIG. 9, it is assumed that the four following customer orders must be processed simultaneously (two customer orders for each destination):
- a first customer order listing five loads denoted (according to the sequential order of the first customer order) as: B, 2B, 3B, 4B and 5B. It is intended for the first destination (target 1);
- a second customer order listing five loads denoted (according to the sequential order of the second customer order) as: 1D, 2D, 3D, 4D and 5D. It is intended for the first destination (target 1);
- a third customer order listing five loads denoted (according to the sequential order of the third customer order) as: 1A, 2A, 3A, 4A and 5A It is intended for the second destination (target 2);
- a fourth customer order listing five loads denoted (according to the sequential order of the third customer order) as: 1C, 2C, 3C, 4C and 5C It is intended for the second destination (target 2).

FIG. 9 illustrates the loads of these four customer orders at three different instants.

At a first instant, following a first sequencing, the loads are brought out from the sources and are situated in the source buffer devices 81 and 82. More specifically, following the first sequencing performed by the control system, the loads have been brought out of the sources according to the sequential order of each customer order (by contrast, there is not yet any sequencing between customer orders). Thus, the source buffer device 81 has successively received the loads 3B, 1C, 1A, 2D, 3A, 4D, 4B, 2C and 5A. The source buffer device 82 has successively received the loads 1B, 3C, 2A, 1D, 4A, 3D, 2B, 4C, 5B and 5D.

At a second instant, following a first phase of a second sequencing, each of the loads (exiting a given source and having to be directed towards a given destination) has been routed towards one of the two intermediate buffer devices which are each associated with the given destination and dual to the given source (the choice among the two devices is done according to the customer order). Thus, for the first customer order, the intermediate buffer device 94a has successively received the loads 1B, 2B and 5B, and the intermediate buffer device 94b has successively received the loads 3B and 4B. For the second customer order, the intermediate buffer device 95a has successively received the loads 1D, 3D and 5D, and the intermediate buffer device 95b has successively received the loads 2D and 4D. For the third customer order, the intermediate buffer device 97a has successively received the loads 2A and 4A, and the intermediate buffer device 97b has successively received the loads 1A, 3A and 5A. For the fourth customer order, the intermediate buffer device 96a has successively received the loads 3C, 4C and 5C, and the intermediate buffer device 96b has successively received the loads 1C and 2C.

At a third instant, following a second phase of the second sequencing, the loads have, for each customer order, been placed on the second main collector section 86 according to the sequential order of this customer order. Then, at the exit from the second main collector section 86, the loads have been routed towards the appropriate destination. Thus, the destination buffer device 87 has successively received the loads 1B, 2B, 3B, 4B and 5B of the first customer order, then the loads 1D, 2D, 3D, 4D and 5D of the second customer order. The destination buffer device 88 has successively received the loads 1A, 2A, 3A, 4A and 5A of the third customer order, then the loads 1C, 2C, 3C, 4C and 5C of the fourth customer order.

In one particular implementation, the control system is adapted to making a dynamic allocation of the intermediate buffer devices 94a, 94b, 95a, 95b, 96b, 97a and 97b among the destinations, according to the destination or destinations effectively used. This makes it possible, for example, to simultaneously process three customer orders for the first destination, and only one customer order for the second destination.

In addition to the embodiments described here above, it is possible to envisage many other embodiments of the technique for processing a customer order according to the invention without departing from the framework of the present invention. It is possible especially to plan for other types of sources.

An exemplary embodiment of the present disclosure provides a technique for processing a customer order by using a control system for controlling a system of automated distribution, this technique making it possible to overcome the constraint (which exists in the prior art) of synchronization between the exits from sources (synchronization giving rise to a non-negligible loss of the nominal rates of each source).

An exemplary embodiment of the disclosure provides a technique of this kind by which the destinations are made independent of each other.

An exemplary embodiment of the disclosure provides a technique of this kind that is simple to implement and costs little.

An exemplary embodiment of the disclosure provides a technique of this kind for the simultaneous processing of several customer orders intended for a same customer-order preparing station.

Although the present disclosure has been described with reference to one or more examples, workers skilled in the art will recognize that changes may be made in form and detail without departing from the scope of the disclosure and/or the appended claims.

The invention claimed is:

1. A system of automated distribution comprising:
   sources storing loads;
   at least one destination receiving loads;
   a control system configured to process customer orders,
   a first common transportation system for transportation of the loads exiting the sources;

downstream from the first common transportation system and, upstream to each destination and associated with each destination, at least one plurality of first FIFO-type buffer devices, each dual to one of the sources, wherein, to process a given customer order listing loads that have to be extracted from the sources and provided in a given sequential order to a given destination, the control system is configured to:

carry out a first sequencing by commanding each source so that the loads of the given customer order, stored in said source, exit said source in accordance with the given sequential order;

carry out a second sequencing:
by routing each of the loads of the given customer order, exiting the first common transportation system coming from a given source, towards the first buffer device associated with the given destination and dual to the given source; and by commanding the plurality of first buffer devices associated with a given destination so that the loads listed in the given customer order exit towards the given destination according to the given sequential order, or by providing an operator situated at the given destination, via a man-machine interface, with information for taking, according to the given sequential order, the loads listed in the given customer order in the first buffer devices associated with a given destination.

2. The system of automated distribution according to claim 1, further comprising, associated with at least one same given destination, at least two pluralities of FIFO-type first buffer devices, each dual to one of the sources, and, to simultaneously process at least two customer orders listing loads that have to be provided to a same given destination, the control system is configured to use each plurality of first buffer devices, in the context of the second sequencing, to process a distinct customer order among said at least two customer orders.

3. The system of automated distribution according to claim 1, further comprising at least one of:
a second FIFO-type buffer device placed immediately downstream from each source and upstream to each common transportation system; or
a third FIFO-type buffer device placed immediately upstream to each destination and downstream from the first common transportation system.

4. The system of automated distribution according to claim 1, further comprising at least two destinations, each associated with at least one plurality of first buffer devices, and said first common transportation system is configured to transport the loads between the sources and the pluralities of the first buffer devices associated with the destinations.

5. The system of automated distribution according to claim 4, wherein the control system is configured to activate, upon detection of an unoccupied place in one of the first buffer devices associated with a given destination, an exit order so that a load, intended for said first buffer device, exits the source to which said first buffer device is dual or exits a FIFO-type buffer device placed immediately downstream to the source, to which said first buffer device is dual, the load that has exited being taken charge of by said first common transportation system.

6. The system of automated distribution according to claim 5, wherein, at least for a first given buffer device, the control system is configured to deliver a number of exit order greater than the number of unoccupied places in said given buffer device.

7. The system of automated distribution according to claim 1, further comprising: at least two destinations each associated with at least one plurality of first buffer devices; and a second common transportation system configured to transport loads between the destinations and the plurality of first buffer devices associated with the destination.

8. The system of automated distribution according to claim 7, wherein the control system is configured to carry out a dynamic allocation of the first buffer devices among the destinations, as a function of the destination or destinations effectively used.

9. A method for processing a customer order by using a control system for controlling a system of automated distribution, said system of automated distribution comprising sources storing loads, a first common transportation system for transportation of loads exiting the sources and at least one destination receiving loads, wherein the method comprises the following steps for processing a given customer order listing loads that have to be extracted from the sources and provided in a given sequential order to a given destination:
the control system carries out a first sequencing, in commanding each source so that the loads of the given customer order stored in said source exit said source in compliance with the given sequential order; and
the control system carries out a second sequencing:
by routing each of the loads of the given customer order exiting the first common transportation system coming from a given source, towards a buffer device associated with the given destination and dual to the given source, a plurality of FIFO-type buffer devices being associated with and being situated upstream to each destination and each being dual to one of the sources, said plurality of FIFO-type buffer devices being situated downstream from the first common transportation system; and
by commanding the plurality of buffer devices associated with the given destination so that the loads listed in the given customer order exit towards the given destination according to the given sequential order, or by providing an operator situated at the given destination, via a man-machine interface, with the information for taking, according to the given sequential order, the loads listed in the given customer order in the buffer devices associated with the given destination.

10. A computer-readable and non-transient storage medium storing a computer program comprising a set of instructions executable by a computer of a control system to implement a method for processing a customer order by using the control system for controlling a system of automated distribution, said system of automated distribution comprising sources storing loads, a first common transportation system for transportation of loads exiting the sources and at least one destination receiving loads, wherein the method comprises the following steps for processing a given customer order listing loads that have to be extracted from the sources and provided in a given sequential order to a given destination:
the control system carries out a first sequencing, in commanding each source so that the loads of the given customer order stored in said source exit said source in compliance with the given sequential order; and
the control system carries out a second sequencing:
by routing each of the loads of the given customer order exiting the first common transportation system coming from a given source, towards a buffer device associated with the given destination and dual to the given source, a plurality of FIFO-type buffer devices being associated with and being situated upstream to each destination and each being dual to one of the sources, said plurality of FIFO-type buffer devices being situated downstream from the first common transportation system; and by commanding the plurality of buffer devices associated with the given destination so that the loads listed in the given customer order exit towards the given destination according to the given sequential order, or by providing an operator situated at the given destination, via a man-machine interface, with the information for taking, according to the given sequential order, the loads listed in the given customer order in the buffer devices associated with the given destination.

* * * * *